United States Patent [19]
Stokes

[11] Patent Number: 5,634,092
[45] Date of Patent: May 27, 1997

[54] COLOR IMAGE PROCESSING SYSTEM WHICH PROVIDES MULTIPLE IMAGE PROCESSING OPERATIONS THROUGH A SINGLE INTERFACE

[75] Inventor: Michael Stokes, Cupertino, Calif.

[73] Assignee: Apple Computer, Inc., Cupertino, Calif.

[21] Appl. No.: 312,918

[22] Filed: Sep. 30, 1994

[51] Int. Cl.$^6$ ........................................... G06T 11/00
[52] U.S. Cl. ................................... 395/118; 395/131
[58] Field of Search ......................... 395/118, 128–132, 395/133

[56] References Cited

U.S. PATENT DOCUMENTS

| | | | |
|---|---|---|---|
| 4,685,125 | 8/1987 | Zave | 379/96 |
| 4,833,594 | 5/1989 | Familetti et al. | 395/700 |
| 5,175,679 | 12/1992 | Allen et al. | 364/148 |
| 5,270,806 | 12/1993 | Venable et al. | 358/500 |
| 5,301,277 | 4/1994 | Kanai | 395/650 |
| 5,392,448 | 2/1995 | Frankel et al. | 395/800 |
| 5,404,529 | 4/1995 | Chernikoff et al. | 395/700 |
| 5,471,675 | 11/1995 | Zias | 395/164 X |

*Primary Examiner*—Almis R. Jankus
*Attorney, Agent, or Firm*—Burns, Doane, Swecker & Mathis

[57] ABSTRACT

An image processing system provides a single interface between the application program and the operating system, through which all image processing services are accessed. This interface includes a dispatcher which directs a call for a particular image processing function, as well as calls that require color matching, to the appropriate components which perform the desired services. Various functions such as color modeling, image compression, image format translation, and standard image processing are available to all application programs through the computer's operating system, in addition to color matching. This approach supports such operations as process scripting and hardware acceleration, to thereby enhance the features and efficiency of functions that are available to the user.

26 Claims, 2 Drawing Sheets

"Prior Art"
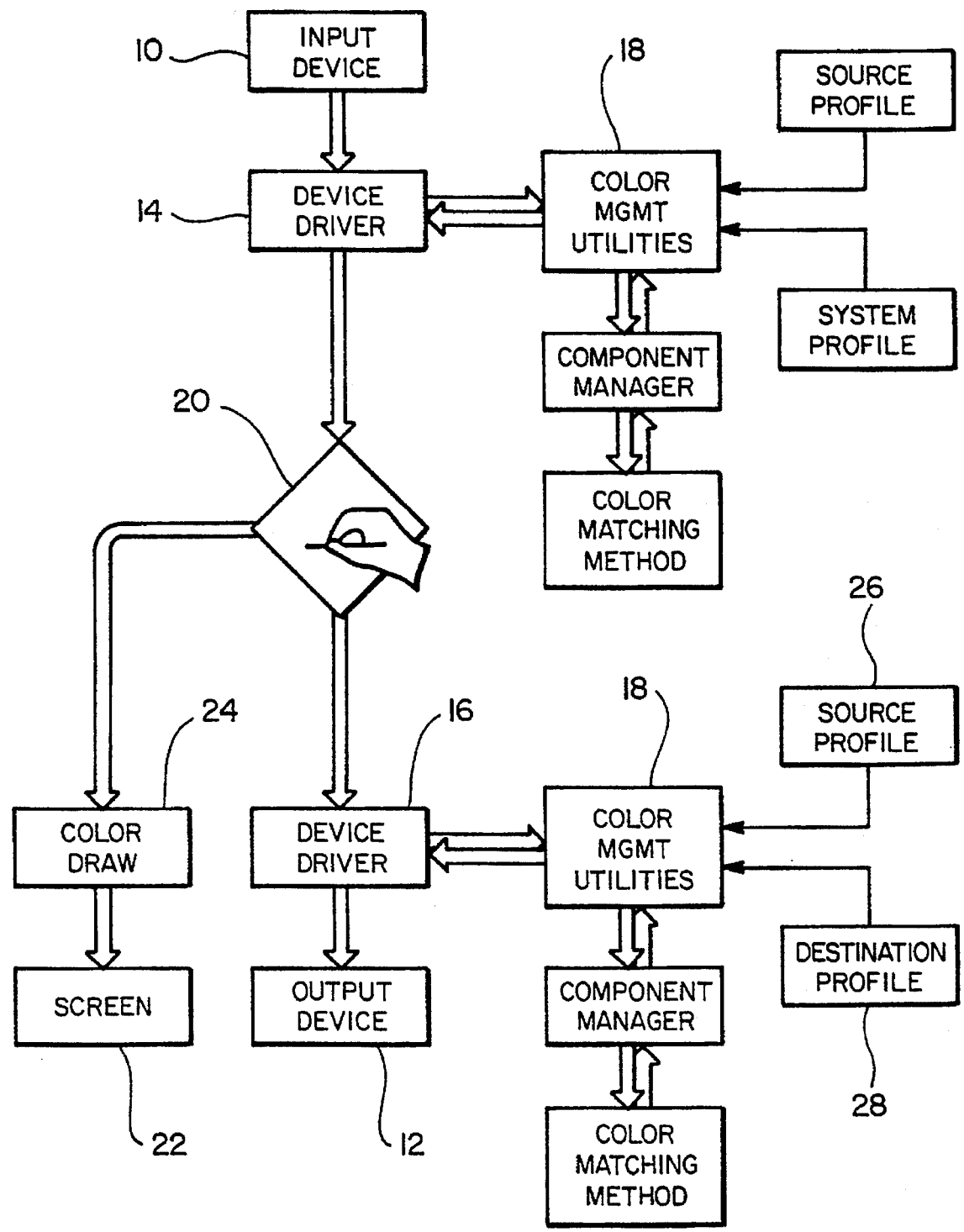
FIG_1

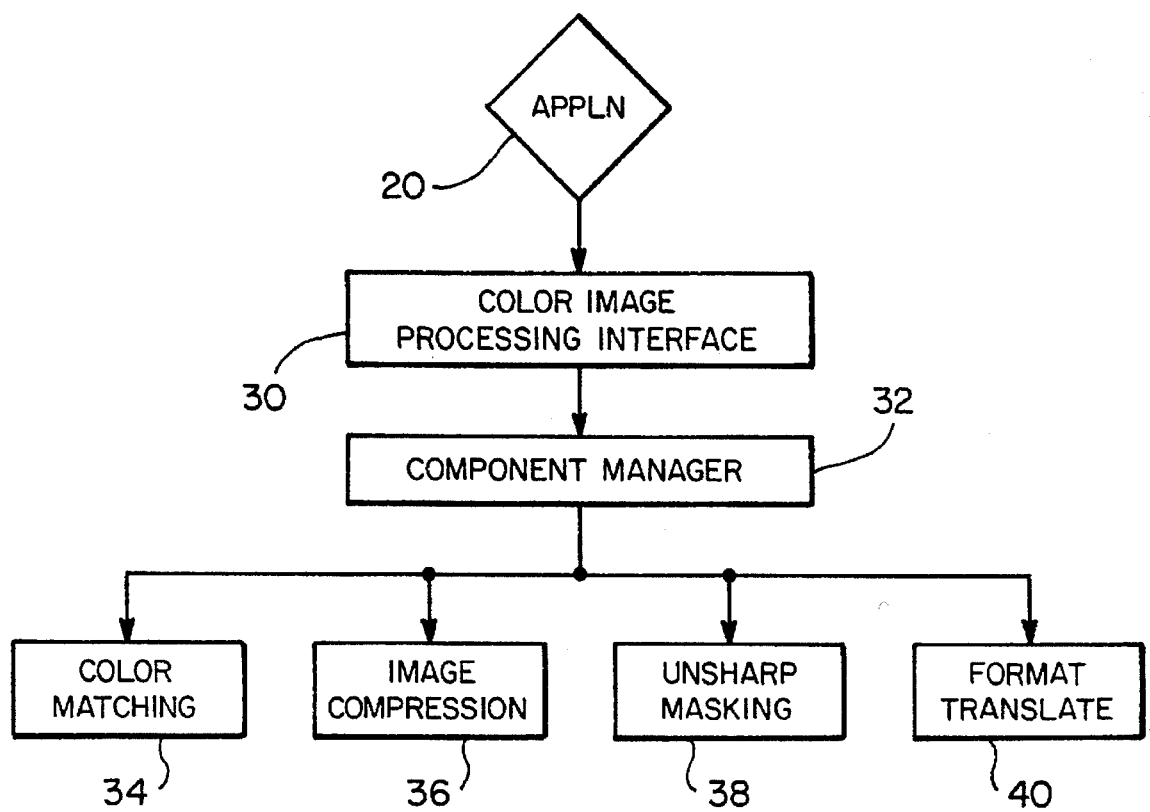
FIG_2
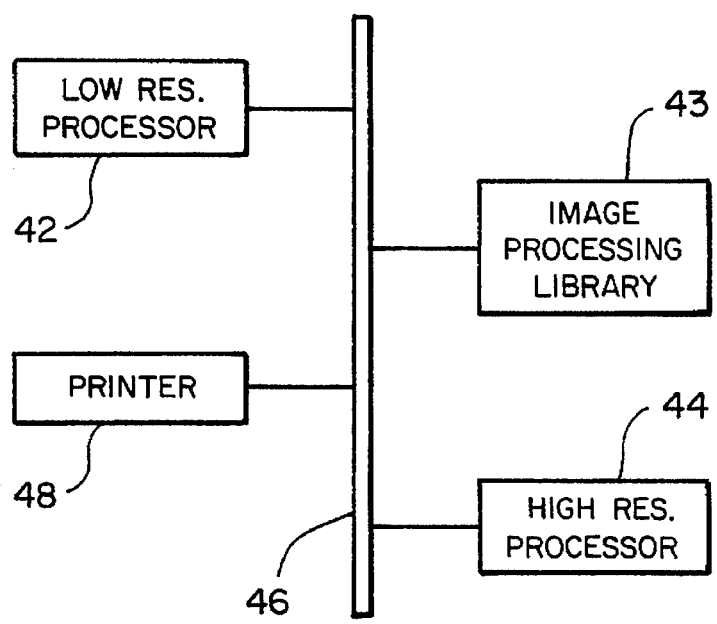
FIG_3

COLOR IMAGE PROCESSING SYSTEM WHICH PROVIDES MULTIPLE IMAGE PROCESSING OPERATIONS THROUGH A SINGLE INTERFACE

The present invention is directed to the processing of color images in computers, and more particularly to a system which integrates image processing functions with color management services.

BACKGROUND OF THE INVENTION

In the past, color management systems have been provided in computer systems to assure consistency of results in color images that are produced with various types of color input and output devices. More particularly, each type of input and output device for a computer operates in accordance with a characteristic color space. For example, monitors typically display colors as combinations of red, blue and green, and are therefore considered to operate in an RGB color space. In contrast, the color space that is employed in printers is defined by the types of inks or toners used in these devices. Typically, these inks are based upon the colors cyan, magenta, yellow and black. Consequently, printers are considered to work in a CMYK color space.

As a result of the different color spaces that are employed in various input and output devices, the same image reproduced on two different devices may have perceptively different appearances. These differences are particularly noticeable for an image which is displayed on a monitor and printed by a color printer. To correct for these differences between devices which employ respectively different color spaces, color management systems have been employed in computers which are designed to work with color graphic images. Generally speaking, a color management system provides for matching of the color characteristics of one device, such as a monitor, with those of another device, such as a printer, to provide consistent results regardless of the particular input or output device that is being used. One example of a color management system which provides this type of service is ColorSync™, developed by Apple Computer, Inc. of Cupertino, Calif. Further information regarding the structure and operation of this system can be found in U.S. patent application Ser. No. 07/854,309, filed Mar. 19, 1992 and entitled "Color Matching Apparatus and Method", the disclosure of which is incorporated herein by reference.

A color management system of this type provides a consistent, common interface for matching the characteristics of various types of input and output devices that are used to read and generate color images. It provides a collection of services, namely a set of color management utilities and functions, that are independent of application programs running on a computer. As a result, a coherent, unified solution to the color matching problem is presented upon input and output of image data, regardless of the application programs which are being used to process that data.

To date, this application-independent collection of services has been limited to color management functions, most notably color matching. It is desirable to extend the functionality of a color management system to other types of image processing operations. However, these other types of image processing operations differ from color management in the way in which they handle the image data. More particularly, color-based functions, such as color matching, operate on images for correcting color data for one picture element, or pixel, at a time. Even functions which support the transfer of data for an entire image at one time must operate on that data one pixel at a time. In contrast, other types of image processing operations such as image compression, unsharp masking, ink trapping and other spatial processes require that multiple pixels of the image be processed at one time. Services that operate on one pixel at a time, such as color matching utilities, do not support these other types of operations.

Some color graphics application programs include a facility which enables image processing functions to be added thereto. For example, a filter might be plugged into an application program to enable aliasing effects or other types of defects, such as scratches in a scanned photograph, to be removed. Typically, such a filter is designed for one particular application program, and can not be used with other color graphics programs. If it is desirable to use the filter with other programs, it has to be redesigned for each different program with which it is to be used.

Unfortunately, not all application programs provide the same types of image processing services. For example, one program may offer compression, while another can include filters for unsharp masking or the like. If the user desires to have both of these functions carried out with respect to an image, it is necessary to switch between the two application programs to do so. There is no unified set of functions which provides a user with access to all of the desirable image processing services.

Furthermore, in the past each item of image processing capability was plugged into the basic application program as an add-on module, and thereby added to the overall size of the program. As a result, application programs that provided a number of image processing capabilities became large and inefficient.

It is therefore desirable to extend the functionality of color management systems in a manner that enables most, if not all, color image processing services to be provided in a unified, coherent manner. It is further desirable to provide such capabilities through a single interface, or bottleneck, to the computer's operating system, so that the same types of services are available to any application program, as well as provide for the capability for distributed processing of an image.

BRIEF STATEMENT OF THE INVENTION

In accordance with the present invention, these objectives are achieved by means of a framework that extends color management beyond single-pixel color correction. Entire images, or portions thereof, are processed at a time, to provide a complete range of image processing functions. This processing is made available through a single interface between the application program and the operating system. The interface also permits the image processing services to be distributed among two or more different processors. The interface includes a dispatcher which directs a call for a particular image processing function, as well as calls that require color matching, to the appropriate components which perform the desired services. Thus, various functions such as color modeling, image compression, image format translation, and standard image processing are available to all application programs through the computer's operating system, in addition to color matching. This approach supports such operations as process scripting and hardware acceleration, to thereby enhance the features and efficiency of functions that are available to the user.

These and other features of the invention, as well as the advantages offered thereby, are explained in greater detail with reference to particular embodiments of the invention illustrated in the accompanying drawings.

BRIEF DESCRIPTION OF THE DRAWINGS

FIG. 1 is a block diagram of the architecture of a color management system;

FIG. 2 is a block diagram of the architecture of an image processing system in accordance with the present invention; and FIG. 3 is a block diagram of a distributed processing system which can implement the present invention.

DETAILED DESCRIPTION

In general, the present invention provides a framework which enables a variety of operations to be performed on images, including operations that are carried out on multiple pixels at a time. This framework exists at the level of the computer's operating system, and provides any application program with access to a suite of image processing operations, as long as the program has the necessary "hooks", e.g. library of calls, for accessing these operations. In one sense, the invention can be envisioned as an extension of a color management system. In the following description of specific embodiments of the invention, reference is made to the structure and operation of a particular color management system, namely ColorSync™, where appropriate to facilitate an understanding of the invention. It will be appreciated, however, that the practical applications of the invention are not limited to use with this particular color management system. Rather, it will find utility in any computer system in which it is desirable to provide a variety of image processing functions, regardless of the particular color management system being employed.

Referring to FIG. 1, the general architecture of a color management system for a computer is shown. Each input device 10 of the computer, such as a scanner, and each output device 12, for example each display monitor and printer, has an associated device driver 14, 16 which provides a color profile for that device. The color profile may include, for example, a description of the color space within which the device operates, as well as the gamut of colors that are available within that color space. When each device is connected to the computer system, or upon initial startup, the device driver provides the color profile to color matching utilities 18 which form part of the color management system.

Whenever image data is transferred from one device to another, the color management system translates the color data in accordance with the respective color profiles of the two devices. For example, a photograph might be scanned into the computer system with an input device 10, as data for an application program 20. The application could be a graphics program for editing images, for example. While the user is editing the photograph, it is desirable to display the image on the computer's monitor 22, to view the changes being made. To do so, the application sends the data to a color drawing utility 24, which controls the display of the data on the monitor's display screen. As originally presented to the drawing utility, the color data is in the format provided by the scanner. Before displaying the image on the screen, it is desirable to convert it into data that corresponds to the color profile of the screen. Therefore, the drawing utility 24 provides the color data to the color matching utilities 18. In response to the receipt of this data, the color management system translates the color data for the image into the appropriate data for drawing the image on the monitor's screen.

In this operation, the color matching utilities refer to the color profile 26 of the device which is the source of the color data, in this case the scanner, and the color profile 28 of the destination device, i.e. the screen. The colors of the source profile are matched to those of the destination profile using a color matching method, which is an algorithm that determines how to convert colors. If the source and destination profiles can use the same color matching method, the colors from the source profile are mapped directly into the color gamut of the destination profile. If different color matching methods are required for the two profiles, the colors from the source profile are mapped to a device-independent color space, such as the XYZ color space, using the matching method associated with the source profile. The colors are then mapped from the device-independent color space to the destination profile, using the color matching method associated with the destination profile. After this mapping has been carried out, the converted color data for the image is provided to the color drawing utility 24, which controls the display of the data on the screen to generate an image with colors that correspond to those of the original scanned photograph.

A similar type of operation takes place whenever the image data is sent to any other device 12, such as a printer for producing a hard copy of the image. Further information regarding the method for matching colors in this manner, as well as the details of the system for performing this operation, are described in previously mentioned U.S. patent application Ser. No. 07/854,309 filed Mar. 19, 1992.

The color matching process is carried out on a pixel-by-pixel basis. More particularly, the color data for each pixel of the image can be individually sent from the drawing utility to the color management system, to be separately processed and returned to the drawing utility. Alternatively, it is possible to send an entire image to the color management system at once. However, the actual color matching function is carried out on a pixel-by-pixel basis. In accordance with the present invention, the handling of color matching data is carried out on a complete image, or other multiple pixel basis, by means of a framework which provides all application programs access to a suite of image processing services. By handling the information in this manner, other image processing services can be carried out on the image at the same time as the color matching.

FIG. 2 illustrates the architecture of a color image processing system in accordance with the present invention. Referring thereto, whenever an application 20 desires any services related to image processing, it communicates with an interface 30. This interface forms part of the operating system for the computer. In response to a request for a particular service, the interface 30 makes a call to a component manager 32, which also resides at the operating system level. The component manager functions as a dynamically linking library that determines which programs to call up and when to do so. In response to a request from the application program for a particular service, the component manager 32 loads the required programs and executes the requested functions.

Any type of image processing service can be made available to the application programs through the framework provided by the interface 30 and the component manager 32. For example, as shown in FIG. 2, the available services can include a color matching function 34, as provided by a color management system, an image compression function 36, an unsharp masking function 38, and format translation 40. Other image processing functions beyond those illustrated in FIG. 2 can also be provided. Examples of such other functions include ink trapping, anti-aliasing, and other types of image data filtering.

By providing the services via this type of framework, such services are not limited to use with specific application programs. Rather, any graphics program can utilize any of the services, and therefore all applications can provide the exact same functionality. Each application obtains the services by means of a common call to sets of image processing functions, instead of having to supply its own functionality. As a result, the user is not forced to process the image with one application to obtain one result, e.g. unsharp masking, and then use a different program to obtain yet another service, such as image compression. Rather, the user is provided with a single coherent interface through which all available image processing services can be accessed.

This approach results in more efficient image processing operations. Each of the services provided through the component manager 32 is dynamically loadable. In particular, the component manager causes the appropriate code for the desired services to be loaded into the computer at run time, as needed. When the servicing of the image is complete, the code can be unloaded, in contrast to application-specific operations that must be compiled into a program before they can run. As a result of this approach, the application program itself does not have to be a large monolithic program to provide all desirable services to the user. Rather, the application need only be directed to the specific function for which it was originally designed, such as image editing. All other image processing functions are provided to the application as an operating system level service. This approach provides the added benefit of allowing third parties to develop different image processing functions without being tied to the functionality of a particular application program.

The application program must be aware of the various services that are available in order to provide the user with access to such services. This information can be provided to the application through one of two routes. Some services may have been placed in the computer system by the application program itself. For example, as part of the procedure for installing the application program on the computer, one or more of the image processing services may have also been loaded into the computer's storage. Thus, the application will inherently know of the availability of those services. For other services which were not installed in conjunction with the application, information about the availability of these services is provided through a call made by the application to the operating system. For example, when the application program is first launched, it can make a call to the interface 30, requesting a list of the available image processing services. This call is routed to the component manager, which examines the image processing utilities to which it has access. A list of these utilities is returned to the application program, which then builds a menu that identifies the services, so that they can be selected by the user.

The functionality provided by this arrangement facilitates hardware acceleration through distributed processing as well. More particularly, process scripting can be employed to create a record of all services desired by the user. FIG. 3 illustrates an arrangement in which this approach can be employed. Referring thereto, a user might typically perform image editing functions with an interactive application that runs on a less powerful computer, such as a personal computer 42. Because of limited processing power, it may be necessary to work with low-resolution data when editing the image in the personal computer. After the user has finished editing the image, or during the editing procedure, he or she may select one or more of the image processing services to be performed on the image data. For example, the user may request that scratches and other defects be removed from the image. In addition, the user may request that the image be compressed for storage and/or transmission purposes. Finally, the user may send a command to print the image at a particular printer, which requires that the color matching function be performed. Each of these services are provided from a library 43 of image processing services.

As each of these functions is requested by the user, it is not carried out immediately by the system services. Rather, the commands from the application program are sent to the interface 30, which routes them to the component manager 32, as described previously. The component manager determines which programs are to be called up in response to each command, and returns an identification of those programs to the interface 30. In response, the interface creates a script, using any suitable scripting language, such as Apple Script developed by Apple Computer, Inc. This script comprises a list of all of the calls made by the application program and the return data provided by the component manager.

When the user has finished selecting all of the desired services, a command is issued to process the image. In response thereto, the script is attached to a high resolution version of the image data, and this data, together with the script, is forwarded to a more powerful processor 44, which has the capability to process the higher resolution image with a non-interactive program. This high resolution processor may be connected to the low resolution processor via a suitable network 46, for example. Upon receiving the image data and the script, the processor 44 makes the same calls to each of the services in the library 43, as identified in the script, and implements them on the image data. Thus, in the particular example described above, the image data is filtered to remove scratches and other defects, and color matching is carried out on the color data for the image, after which it is forwarded to a designated printer 48. Finally, the image data is compressed and the image is stored and or transmitted to another location designated by the user.

Thus, the higher-powered processor does its work off-line, enabling the graphic artist, or other user, to work with an interactive application on the lower-powered processor in near real time, without having to wait for the processing of the image as each function is requested.

From the foregoing, it can be seen that the present invention provides a single interface, or bottleneck, for all spatial and color image processing functions, which obviates the need to bundle specific types of functionality with individual application programs. This approach allows for distributed processing, more efficient processing, and lower input/output requirements.

It will be appreciated by those of ordinary skill in the art that the present invention can be embodied in other specific forms without departing from the spirit or essential characteristics thereof. For example, while a preferred embodiment of the invention has been described in connection with the processing of color images, the principles of the invention are not limited thereto. Rather, the arrangement by which a single interface can be employed to provide access to all image processing functions can be applied to monochrome images as well. Similarly, the invention is not limited to the processing of single images at a time. It can be used with equal success in the processing of sequences of images, such as motion pictures. For example, it can be employed in processes such as colorization and image compression, where information from one frame of information is used in the processing of a subsequent frame. Another application of the invention is in the processing of three-dimensional images, for example in connection with radiosity computations and shading algorithms.

The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. In a computer, a system for providing a variety of image processing functions to graphic application programs, comprising:

a library containing a plurality of individual, dynamically loadable image processing programs, said individual programs including at least one color management system which converts color data pertaining to one computer input/output device into color data for a different input/output device, and at least one program that provides an image processing service that processes multiple picture elements of an image at a time;

an operating system for controlling the operation of said computer, said operating system including an interface which communicates with application programs running on said computer to receive requests from said application programs for image processing services; and a dispatcher responsive to requests for image processing services received at said interface for loading selected ones of the programs in said library into the computer and causing the loaded programs to execute the requested services.

2. The system of claim 1 wherein said interface includes means responsive to requests for an image processing service made by an application program for creating a script file which identifies each request made and the programs in the library which are called by said dispatcher in response to each request, and for attaching said script file to a data file for an image.

3. The system of claim 1 wherein said dispatcher causes said programs to be unloaded after the requested services have been executed.

4. The system of claim 1 wherein said image processing service comprises image compression.

5. The system of claim 1 wherein said image processing service comprises unsharp masking.

6. The system of claim 1 wherein said image processing service comprises format translation.

7. A computer system for distributed processing of graphic images, comprising:

a first computer for running an application program through which a user can edit a graphic image;

a library storing a plurality of dynamically loadable image processing programs;

means for presenting the user with a list of image processing services available through the programs stored in said library, said list being provided to the user via said first computer;

means in said first computer for creating a script file in response to user requests for image processing services from said list, which script file identifies the requested services and the stored programs associated with said services;

a second computer for loading selected ones of the stored programs that are identified in a script file and performing requested services on a graphic image; and means for transmitting said script file created in said first computer to said second computer together with an associated graphic image file.

8. The computer system of claim 7 wherein said graphic image is edited in said first computer in a low-resolution format and is processed in said second computer in a higher resolution format.

9. The computer system of claim 7 wherein said list presenting means comprises an interface through which application programs can access the programs stored in said library, and a dispatcher for calling and loading selected ones of said programs.

10. The computer system of claim 7 wherein one of said image processing programs comprises a color management system for converting color data for one image input/output device into color data for a different image input/output device.

11. The computer system of claim 7 wherein at least some of said image processing programs process multiple picture elements of an image to determine a picture element value for a processed image.

12. The computer system of claim 11 wherein one of said image processing programs comprises an image compression program.

13. The computer system of claim 11 wherein one of said image processing programs comprises an unsharp masking program.

14. The computer system of claim 11 wherein one of said image processing programs comprises a format translation program.

15. A system for providing a variety of image processing functions to graphic application programs, comprising:

a library containing a plurality of individual, dynamically loadable image processing programs, said individual programs including at least one color management system which converts color data pertaining to one image input/output device into color data for a different image input/output device, and at least one program that provides an image processing service that processes multiple picture elements of an image to determine a picture element value for a processed image;

an operating system including an interface which communicates with graphic application programs to receive requests from said application programs for image processing services; and a dispatcher responsive to requests for image processing services received at said interface for calling selected ones of the programs in said library to execute the requested services.

16. The system of claim 15 wherein said interface includes means responsive to requests for an image processing service made by an application program for creating a script file which identifies each request made and the programs in the library which are called by said dispatcher in response to each request, and for attaching said script file to a data file for an image.

17. The system of claim 15 wherein said image processing service comprises image compression.

18. The system of claim 15 wherein said image processing service comprises unsharp masking.

19. The system of claim 15 wherein said image processing service comprises format translation.

20. A method for providing a variety of image processing functions to graphic application programs, comprising the steps of:

storing a library containing a plurality of individual, dynamically loadable image processing programs, said individual programs including at least one color management system which converts color data pertaining to one image input/output device into color data for a different input/output device, and at least one program that provides an image processing service that processes multiple picture elements of an image to determine a picture element value for a processed image;

receiving all requests from graphic application programs for image processing services at a single operating system interface; and loading selected ones of the programs in said library in response to requests received at said interface and causing the loaded programs to execute the requested services.

21. The method of claim 20 further including the steps of creating a script file which identifies each received request and the programs in the library which perform the services specified by each request, and for attaching said script file to a data file for an image.

22. The method of claim 20 wherein said image processing service comprises image compression.

23. The method of claim 20 wherein said image processing service comprises unsharp masking.

24. The method of claim 20 wherein said image processing service comprises format translation.

25. A method for processing a graphic image, comprising the steps of:

storing a library containing a plurality of dynamically loadable image processing programs;

presenting a user with a list of image processing services available through the programs stored in said library;

creating a script file at a first location in response to user requests for image processing services from said list, which script file identifies the requested services and the stored programs associated with said services;

transmitting said script file together with an associated graphic image file to a second location; and loading selected ones of the stored programs that are identified in a script file and performing requested services on a graphic image at said second location.

26. The method of claim 25 wherein said graphic image is edited at said first location in a low-resolution format and is processed at said second location in a higher resolution format.

* * * * *